United States Patent [19]
Yamagishi

[11] Patent Number: 5,777,695
[45] Date of Patent: Jul. 7, 1998

[54] LIGHTING DEVICE TRANSFORMED IN THE DIRECTION OF POLARIZATION AND PROJECTION TYPE IMAGE DISPLAY DEVICE USING THE SAME

[75] Inventor: Shigekazu Yamagishi, Takatsuki, Japan

[73] Assignee: Matsushita Electric Industrial Co., Ltd., Osaka, Japan

[21] Appl. No.: 655,807

[22] Filed: May 31, 1996

[30] Foreign Application Priority Data

Jun. 2, 1995 [JP] Japan .................. 7-136470
Mar. 8, 1996 [JP] Japan .................. 8-051242

[51] Int. Cl.⁶ .................. H04N 5/74; H04N 9/31
[52] U.S. Cl. .................. 348/744; 348/756; 348/757
[58] Field of Search .................. 348/744, 756, 348/757, 762, 781, 760, 782, 759, 761, 766, 751; 359/364, 365, 366, 483, 485, 856, 618; H04N 5/74, 9/31

[56] References Cited

U.S. PATENT DOCUMENTS

| | | | |
|---|---|---|---|
| 2,297,443 | 9/1942 | Ardenne | 348/760 |
| 2,315,113 | 3/1943 | Farnsworth | 348/760 |
| 3,864,730 | 2/1975 | Roth | 348/756 |
| 4,751,509 | 6/1988 | Kubota et al. | 348/760 |
| 4,913,529 | 4/1990 | Goldenberg et al. | 350/337 |
| 5,357,289 | 10/1994 | Konno et al. | 348/757 |
| 5,381,278 | 1/1995 | Shingaki et al. | 359/256 |
| 5,400,180 | 3/1995 | Chung | 348/757 |

FOREIGN PATENT DOCUMENTS

| | | |
|---|---|---|
| 2 693 561 | 1/1994 | France . |
| 3-13983 | 1/1991 | Japan . |
| 04245201 | 9/1992 | Japan . |
| 5-232433 | 9/1993 | Japan . |

*Primary Examiner*—Tommy P. Chin
*Assistant Examiner*—LuAnne P. Din
*Attorney, Agent, or Firm*—Ratner & Prestia

[57] ABSTRACT

In a light valve projection type image display device, a lighting device suitable for a device making use of polarization in particular is presented. A lighting device transformed in the direction of polarization comprising a light source, an elliptical mirror, polarized light selecting means positioned at a second focal point position of the elliptical mirror, collimating for transforming the light from the second focal point of the elliptical mirror into nearly parallel light while reflecting, polarization transforming provided in the collimating, and optical path transforming having an aperture in the central part is provided. The light is separated into first and second directions of polarization by the polarized light selecting. The light in the second direction of polarization is enters the collimating and the direction of polarization is transformed in the same direction as the light of the first direction of polarization. The light is reflected on the same optical axis as the light in the first direction of polarization by the optical path transforming having its aperture positioned to correspond to the position of the polarized light selecting.

5 Claims, 11 Drawing Sheets

LIGHTING DEVICE TRANSFORMED IN THE DIRECTION OF POLARIZATION AND PROJECTION TYPE IMAGE DISPLAY DEVICE USING THE SAME

BACKGROUND OF THE INVENTION

1. Technical Field of the Invention

The present invention relates to a lighting device transformed in the direction of polarization for controlling the state of polarization of light from a light source in one direction and illuminating the light, and a light valve projection type image display device using the same.

2. Prior Art

Instead of a conventional projection type image display device using a cathode-ray tube (CRT), a projection type image display device using a liquid crystal panel as the light valve is being accepted in the marketplace because of its small size, light weight, ease of installation, and low price. This projection type image display device comprises an incident side polarizer for preliminarily limiting the direction of polarization of incident light, a liquid crystal panel for controlling the angle of polarization of incident light, and an exit side polarizer for transmitting only light in a specific direction of polarization. In the conventional embodiment, only about half of the light emitted from the light source can be utilized at maximum, and the brightness of the projected image is insufficient. Besides, the energy of the remaining light not being used generates heat in the device, and hence the reliability of the projection type image display device is lowered.

To solve these problems for a lighting device of a projection type image display device, there has been proposed a lighting device that provides two optical paths provided on to the light valve surface, by separating the light from the light source by polarization selecting means, and then transforming the polarization of half of the polarized component.

In such an embodiment, however, as seen from the irradiating surface side, the apparent size of the light source is about twice as long as the actual length in one direction. Therefore, to take in the light efficiently by the projection optical system, it is necessary to increase the intake angle. As a result, the projection lens becomes very large and expensive. Moreover, because the image of the light source is extended in one direction as mentioned above, an increase in brightness is not expected despite the increased size of the projection lens. If a device whose characteristic varies significantly depending on the incident angle of light, e.g., the conventional transmission type liquid crystal panel, is used as the light valve in the embodiment, since the incident angle of light is large, the picture quality deteriorates.

When transforming the direction of polarization, the transformation efficiency may vary depending on the wavelength. At this time, in comparison between transformed light and non-transformed light, since the incident angle into the light valve is different, the contribution factor of light in the central part of the projected image is different from the contribution factor of light in the peripheral part. Therefore, the color of the central part of the projected image is different from the color of the peripheral part. As a result, in a projection type image display device using the conventional lighting device, a color difference occurs due to the difference in the incident angle of light.

SUMMARY OF THE INVENTION

A first embodiment of a lighting device transformed in the direction of polarization of the invention comprises:

a light source, polarization selecting means for receiving light emitted from the light source, and emitting by dividing optical paths by the direction of polarization, polarization transforming means for transforming the direction of polarization of a divided portion of light emitted from the polarization selecting means, and optical path transforming means for reflecting the light emitted from the polarization transforming means, wherein the polarization selecting means is positioned at the aperture of the optical path transforming means, and the other divided portion of the light emitted from the polarization selecting means and the light reflected by the optical path transforming means are combined.

In this embodiment, the two directions of polarization are the same from the time the optical path is divided by the direction of polarization by the polarization selecting means until the time they are combined again. Therefore, the light from the light source can be utilized at high efficiency.

A second embodiment of the lighting device transformed in the direction of polarization of the invention comprises:

a light source, parallel light transforming means for transforming the light emitted from the light source into parallel light, polarization selecting means for receiving light emitted from the parallel light transforming means, and emitting by dividing optical paths by the direction of polarization, polarization transforming means for transforming the direction of polarization of a divided portion of light emitted from the polarization selecting means, luminous flux magnifying means for magnifying the luminous flux of the light emitted from the polarization transforming means, and optical path transforming means for reflecting the light emitted from the luminous flux magnifying means, wherein the polarization selecting means is positioned at the aperture of the optical path transforming means, and the other divided portion of the light emitted from the polarization selecting means and the light reflected by the optical path transforming means are combined.

In this embodiment, the parallel light is divided into optical paths by the polarization selecting means, the direction of polarization of one divided portion of the light is transformed, and the luminous flux of the light magnified from the luminous flux is combined with the other divided portion of the light divided by the polarization selecting means. Therefore, the light from the light source can be utilized at high efficiency.

A third embodiment of the lighting device transformed in the direction of polarization of the invention comprises:

a light source, polarization selecting means for receiving light emitted from the light source, and emitting by dividing optical paths by the direction of polarization, polarization transforming means for transforming the direction of polarization of a divided portion of light emitted from the polarization selecting means, and optical path transforming means for reflecting the light emitted from the polarization transforming means, wherein the optical path transforming means has an aperture positioned between the light source and the polarization selecting means for passing the light from the light source, and the other divided portion of the light emitted from the polarization selecting means and the light reflected by the optical path transforming means the light are combined.

In this embodiment, the two directions of polarization are the same from the time the optical path is divided by the direction of polarization by the polarization selecting means until the time they are combined again. Therefore, the light from the light source can be utilized at high efficiency.

A fourth embodiment of the lighting device transformed in the direction of polarization of the invention comprises:

a light source, parallel light transforming means for transforming the light emitted from the light source into parallel light, polarization selecting means for receiving light emitted from the parallel light transforming means, and emitting by dividing optical paths by the direction of polarization, polarization transforming means for transforming the direction of polarization of a divided portion of light emitted from the polarization selecting means, luminous flux magnifying means for magnifying the luminous flux of the light emitted from the polarization transforming means, and optical path transforming means for reflecting the light emitted from the luminous flux magnifying means, wherein the optical path transforming means has an aperture, and the other divided portion of the light emitted from the polarization selecting means is passed through the aperture, and combined with the light reflected from the luminous flux magnifying means.

In this embodiment, the aperture of the optical path transforming means is positioned on the optical path of the other divided portion of the light from the polarization selecting means, and the other divided portion of the light passes through this aperture, and is thus combined with the light from the luminous flux magnifying means without being affected by the optical path transforming means. Therefore, the light from the light source can be utilized at high efficiency.

A fifth embodiment of the lighting device transformed in the direction of polarization of the invention comprises:

a light source, parallel light transforming means for transforming the light emitted from the light source into parallel light, polarization selecting means for receiving light emitted from the parallel light transforming means, and emitting by dividing optical paths by the direction of polarization, polarization transforming means for transforming the direction of polarization of a divided portion of light emitted from the polarization selecting means, luminous flux transforming means for reducing the luminous flux of the light emitted from the polarization transforming means, and optical path transforming means for reflecting the light emitted from the luminous flux transforming means, wherein the optical path transforming means is at a position corresponding to the optical path of the light in another direction of polarization emitted from the polarization selecting means, and the light reflected by the optical path transforming means and the light in the other direction of polarization are combined.

In this embodiment, since the luminous flux width is reduced to be smaller than the luminous flux width of the other divided portion of the light of the polarization selecting means by the luminous flux transforming means, the optical path transforming means may be small. The other divided portion of the light travels along its optical axis without being affected by the optical path transforming means which is sufficiently smaller as compared with the luminous flux width, and the light thus divided by the direction of polarization is combined by the optical path transforming means. However, before entering the optical path transforming means, the one divided portion of the light is transformed by the polarization transforming means in the direction of polarization, and the direction of polarization of the combined light may be united into light of one direction. Thus, a lighting device transformed in the direction of polarization capable of controlling in one direction of polarization while minimizing the loss of the light from the light source is presented.

A first embodiment of a projection type image display device of the invention is comprised by positioning an image display device for displaying an image using polarization in an illuminated position, by utilizing the light combined in the lighting device transformed in the direction of polarization of the invention, and by including a projection lens for magnifying and projecting the image. In this embodiment, the light utilization rate is enhanced, and the generation of heat by absorption of light in the image display device and its periphery can be suppressed. As a result, the projection type image display device realizing an image of high luminance at high efficiency is provided.

A sixth embodiment of the lighting device transformed in the direction of polarization of the invention comprises:

a light source, polarization selecting means for receiving light emitted from the light source, and emitting by dividing optical paths by the direction of polarization, polarization transforming means for transforming the direction of polarization of a divided portion of light emitted from the polarization selecting means, luminous flux transforming means for reducing the luminous flux width of the light provided before or after the polarization transforming means, optical path transforming means for reflecting the light emitted from the polarization transforming means or the luminous flux transforming means, and integrator means for dividing the light emitted from the polarization selecting means, wherein the light emitted from the integrator means and the light reflected by the optical path transforming means are combined.

In this embodiment, while minimizing the loss of the light from the light source, the uniformity of illumination distribution is improved, and the light can be controlled in one direction of polarization.

A second embodiment of the projection type image display device of the invention comprises:

polarization selecting means for receiving light emitted from a light source, and emitting by dividing optical paths by the direction of polarization, polarization transforming means for transforming the direction of polarization of a divided portion of light emitted from the polarization selecting means, luminous flux transforming means for reducing the luminous flux width of the light provided before or after the polarization transforming means, optical path transforming means for reflecting the light emitted from the polarization transforming means or the luminous flux transforming means, and integrator means for dividing the light emitted from the polarization selecting means, wherein the polarization selecting means emits a divided portion of polarized light by dividing into optical paths of plural directions, and the light emitted from the integrator means and the light reflected by the plural optical path transforming means are combined.

In this embodiment, while minimizing the loss of the light from the light source, the uniformity of the illumination distribution is improved, and the light can be controlled in one direction of polarization.

A third embodiment of the projection type image display device of the invention comprises:

polarization selecting means for receiving light emitted from a light source, and emitting by dividing optical paths by the direction of polarization, polarization transforming means for transforming the direction of polarization of a divided portion of light emitted from the polarization selecting means, luminous flux transforming means for reducing the luminous flux width of the light provided before or after the polarization transforming means, optical path transforming means for reflecting the light emitted from the polarization transforming means or the luminous flux transforming means, and integrator means for dividing the light emitted from the polarization selecting means, wherein the light emitted from the integrator means and the light reflected by the optical path transforming means are combined, and further comprising image display means for passing the combined light, and a projection lens for magnifying and projecting the light passing through the image display means.

In this embodiment, comprising the projection lens for magnifying and projecting the image, the light utilization rate is improved, and generation of heat due to light absorption in the image display device or its periphery is suppressed. As a result, a projection type image display device realizing an image of high luminance at high efficiency is provided.

A seventh embodiment of the lighting device transformed in the direction of polarization of the invention comprises:

a light source, polarization selecting means for receiving light emitted from the light source, and emitting by dividing optical paths by the direction of polarization, polarization transforming means for transforming the direction of polarization of a divided portion of light emitted from the polarization selecting means, integrator means for dividing the light provided before or after the polarization transforming means, and optical path transforming means for reflecting the light emitted from the polarization transforming means or the integrator means, wherein the optical path transforming means possesses an aperture, and the other divided portion of the light emitted from the polarization selecting means is passed through the aperture, and is combined with the reflected light.

A fourth embodiment of the projection type image display device of the invention comprises:

one lighting device transformed in the direction of polarization selected from the first to fifth embodiments of the lighting device transformed in the direction of polarization, image display means for transmitting the light created by the lighting device transformed in the direction of polarization, and a projection lens for magnifying and projecting the light passing through the image display means.

In this embodiment, the portions of the light once divided into two optical paths are composed on the same axis, and two portions of the light are easily superposed, thereby eliminating the problem of the shape of the image of the light source extended in one direction as seen from the lighting position at this time. As a result, it is possible to take in light efficiently through the projection lens, so that a bright image is obtained. The size of the image of the light source itself may be partly magnified by the luminous flux magnifying device, but the problem can be solved by optimizing the light source, elliptical mirror, collimator lens and condenser lens.

The colors can be uniformly superposed, and the difference of effect due to location can be suppressed. Moreover, as compared with the prior art, the absolute value of the incident angle is smaller, and in this respect, too, the color unevenness is less obvious.

In these embodiments, light rays in two different directions of polarization of the light source can be transformed into light of one direction of polarization, and the transformed light rays are superposed on one optical axis. Therefore, the utilization efficiency of light is greatly enhanced. As a result, the brightness is about twice as great as in the prior art. Alternatively, to obtain a lighting device having the same brightness as in the prior art, the power consumption is decreased by one-half. The light source and driving circuit can be reduced in size and lowered in price. The projection type image display device using the lighting device transformed in the direction of polarization of the invention prevents incident light in an unnecessary direction of polarization in the light control unit of the image display means, such as a liquid crystal panel, and therefore decreases heat generation, so that a projection type image display device having excellent reliability and high luminance is obtained.

DETAILED DESCRIPTION OF THE INVENTION

Figure 1:
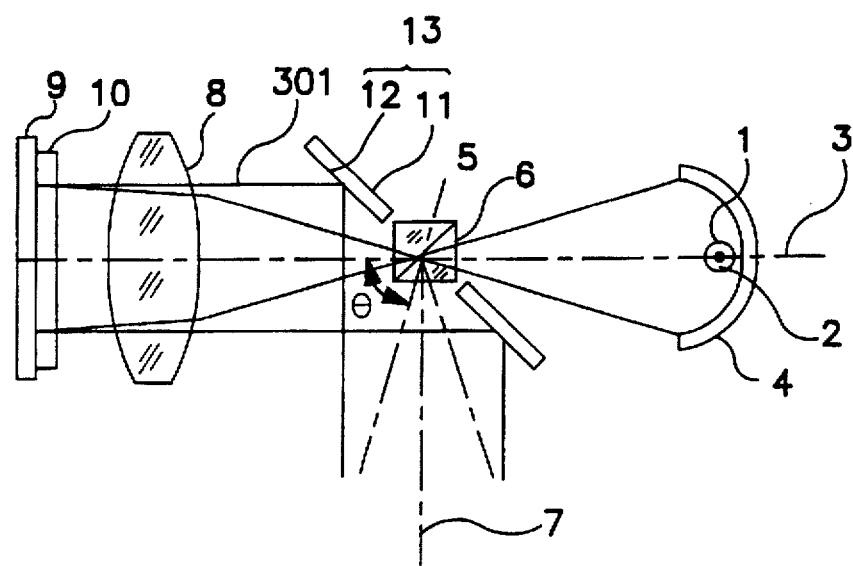
FIG. 1 is a diagram of a first embodiment of a lighting device transformed in the direction of polarization in accordance with the present invention.

Referring now to the drawings, preferred embodiments of a lighting device transformed in the direction of polarization and a projection type image display device of the invention are described in detail below.

(Embodiment 1)

FIG. 1 is a structural diagram of a lighting device transformed in the direction of polarization for explaining a first embodiment of the invention. A light source 1 is positioned at a first focal point 2 of an elliptical mirror 4. In FIG. 1, the light emitted from the light source 1 is condensed in a second focal point position 5 by the elliptical mirror 4 formed to be rotationally symmetrical to the major axis of a first optical axis 3. A polarization beam splitter 6 is provided as a polarization selecting means at the second focal point position 5 of the elliptical mirror 4. The polarization beam splitter 6 reflects the S-polarized light, and the reflected S-polarized light travels onto a second optical axis 7.

On the other hand, the P-polarized light passes through the polarization beam splitter 6, and passes through a collimator lens 8 positioned on the first optical axis 3, then passes through a quarter-wave plate 10 which is a polarization transforming means positioned at the light exit side of the collimator lens 8, and is reflected by a reflector 9 positioned at the back side of the quarter-wave plate 10. The polarized light reflected by the reflector 9 passes again through the quarter-wave plate 10 and the collimator lens 8 to form parallel light 301. The shape of the collimator lens 8 is designed so that the light passing through the collimator lens 8 the second time is parallel light.

The quarter-wave plate 10, which is the polarization transforming means, acts to transform the entering P-polarized light into circular polarized light. Therefore, circular polarized light enters the reflector 9 and is transformed into circular polarized light of reverse rotation. Later, passing again through the quarter-wave plate 10, the light which became a circular polarized light of reverse rotation returns to the first optical axis 3 as 90-degree shifted polarized light (that is, S-polarized light) from the direction of polarization of the first entering light. The returned light enters a combined reflector 13 which acts as an optical path transforming means.

The combined reflector 13 forms an aperture 11 in the central part, and the polarization beam splitter 6 is positioned in the aperture 11. The peripheral part of the combined reflector 13 is a reflection plane 12, and on this reflection plane 12 the light entering from the collimator lens 8 is reflected on the second optical axis 7. In this way, according to the embodiment, almost all the light emitted from the light source is sent out in one direction as light in one direction of polarization.

In this embodiment, the light source 1 is close to a spot light source, and its elliptical mirror 4 is desired to be large. In this embodiment, the light is condensed efficiently on the polarization beam splitter 6. When the solid angle of the light entering the polarization beam splitter 6 is small, splitting by polarization can be done efficiently, and hence the distance between two focal points of the elliptical mirror 4 is preferred to be longer. The thickness of the luminous flux transformed into parallel light by the collimator lens 8 and reflection plane 12 is desired to be as large as possible, and it contributes to reduction of loss due to any defect in the central part of the reflector 13. The angle of parallel light is not strictly required, but it is desired to be optimized by combination with the system. The collimator lens 8 is not absolutely necessary.

In this embodiment, the quarter-wave plate 10 is used as a means for transforming the direction of polarization, but the means for transforming may also be realized by disposing a half-wave plate on or near the polarization beam splitter 6 for the light to pass through after splitting the optical path by the direction of polarization by the polarization beam splitter 6.

Figure 2:
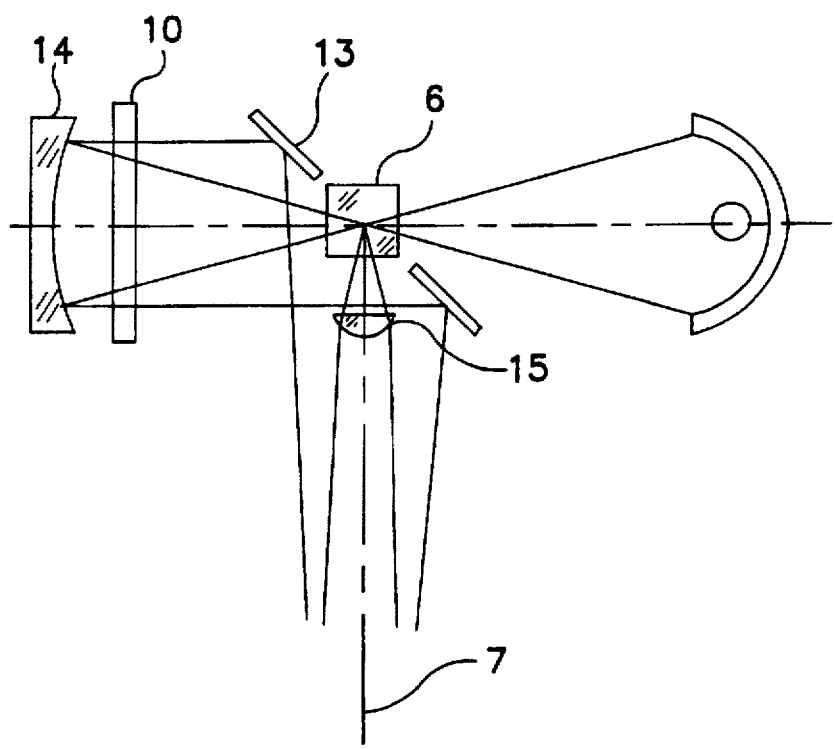
FIG. 2 is a diagram of a modified first embodiment of a lighting device transformed in the direction of polarization in accordance with the present invention.

FIG. 2 shows a modified example of the first embodiment. In the lighting device transformed in the direction of polarization in FIG. 2, the reflector 9 in the lighting device transformed in the direction of polarization in FIG. 1 is replaced by a concave mirror 14. By using the concave mirror 14 as the reflecting means in FIG. 2, the light from the quarter-wave plate 10 is transformed and reflected as parallel light, which eliminates the necessity of the collimator lens. Therefore, the device size is reduced, the loss of light is decreased, and the utilization efficiency of light is enhanced. It is also possible to place a condenser lens 15 as a condensing means on the second optical axis 7. In this embodiment, the structure may be optimized depending on the size of the illuminated surface and the distance to the illuminating position.

(Embodiment 2)

Figure 3:
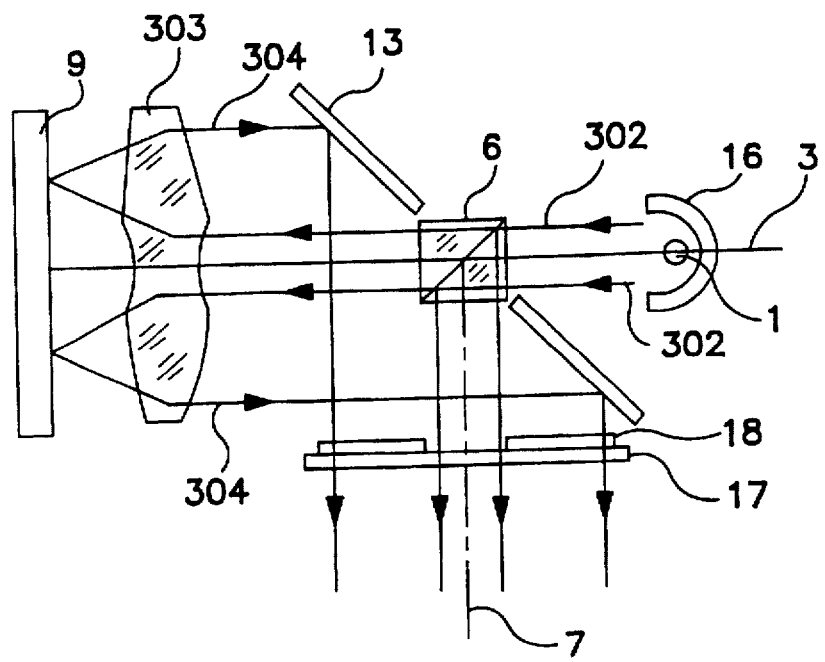
FIG. 3 is a diagram of a second embodiment of a lighting device transformed in the direction of polarization in accordance with the present invention.
Figure 4:
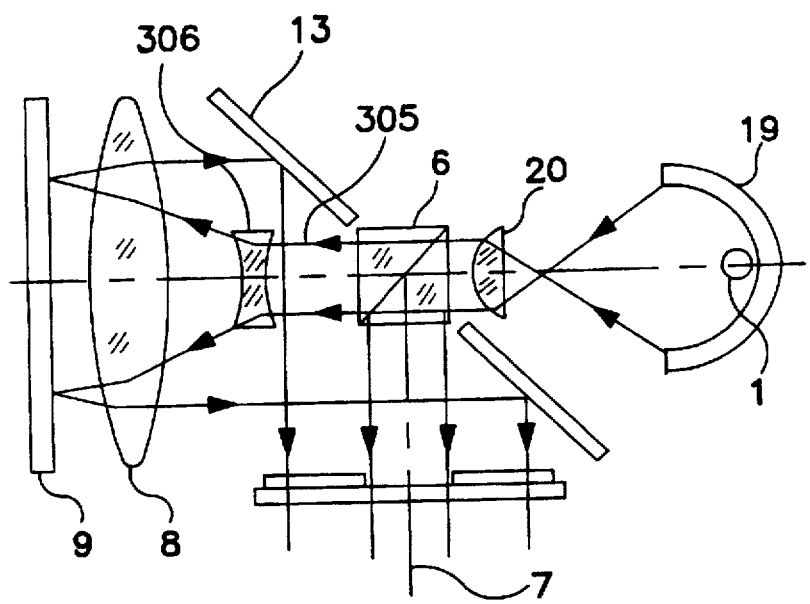
FIG. 4 is a diagram of a modified second embodiment of a lighting device transformed in the direction of polarization in accordance with the present invention.

The embodiment of the lighting device transformed in the direction of polarization for realizing a second embodiment of the invention is described while referring to FIG. 3 and FIG. 4.

FIG. 3 is a structural diagram showing the embodiment of the lighting device transformed in the direction of polarization in the second embodiment of the invention, and FIG. 4 is a structural diagram showing an embodiment of a modified example of the lighting device transformed in the direction of polarization shown in FIG. 3.

In FIG. 3 and FIG. 4, the light emitted from the light source 1 is reflected by a parabolic reflector 16 formed to be rotationally symmetrical to the major axis of the first optical axis 3, and is transformed into parallel light 302. In the lighting device transformed in the direction of polarization shown in FIG. 1 and FIG. 2, the light control means was the elliptical mirror 4 having the second focal point at the position of the polarization beam splitter 6. Instead, as shown in FIG. 3, in the embodiment using the parabolic reflector 16 as the parallel light transforming means for transforming 302 into parallel light, by entering the parallel light 302, the polarization selectivity of the polarization beam splitter 6 can be used advantageously, so that the efficiency of effective utilization of light may be enhanced. On the other hand, by combining the elliptical mirror 19 and collimator lens 20 as shown in FIG. 4, which acts as the parallel light transforming means, it may be also embodied so that the parallel light 302 may enter the polarization beam splitter 6. In this embodiment, the same effects as above can be obtained.

The parallel light 302 enters the polarization beam splitter 6, which acts as a polarization selecting means, and the polarization beam splitter 6 reflects the S-polarized light, which is caused to travel on the second optical axis 7. On the other hand, the P-polarized light passes through the reflection surface of the polarization beam splitter 6, and further passes through a convexo-concave combined collimator lens 303, which acts as a luminous flux magnifying means disposed on the first optical axis 3, and is reflected by the reflector 9, and passes again through the convexo-concave combined collimator lens 303, and is reflected by a combined reflector 13 as parallel light 304.

In FIG. 3, the convexo-concave combined collimator lens 303 is used as the means for magnifying the luminous flux, and a modified example is shown in FIG. 4. In FIG. 4, the parallel light 305 coming from the polarization beam splitter 6 is magnified in the luminous flux by the concave lens 306, and then enters the collimator lens 8. The subsequent traveling path of light is the same as in embodiment 1.

The P-polarized light reflected by the combined reflector 13 passes through a half-wave plate 18 which is a polarization transforming means, and is transformed into S-polarized light. The half-wave plate 18 is supported by a support glass plate 17. The half-wave plate 18 has an aperture near the second optical axis 7, and the S-polarized light reflected by the polarization beam splitter 6 passes through this aperture. Therefore, the light passing through the aperture and the polarized light passing through the half-wave plate 18 are both S-polarized lights, and their tips are combined.

Thus, in the embodiment shown in FIG. 3 and FIG. 4, the light is utilized effectively, and the optical path splitting efficiency by the direction of polarization in the polarization beam splitter 6 is enhanced by the utilization of parallel light. As a result, the light in the direction of polarization finally required can be efficiently obtained.

(Embodiment 3)

Figure 5:
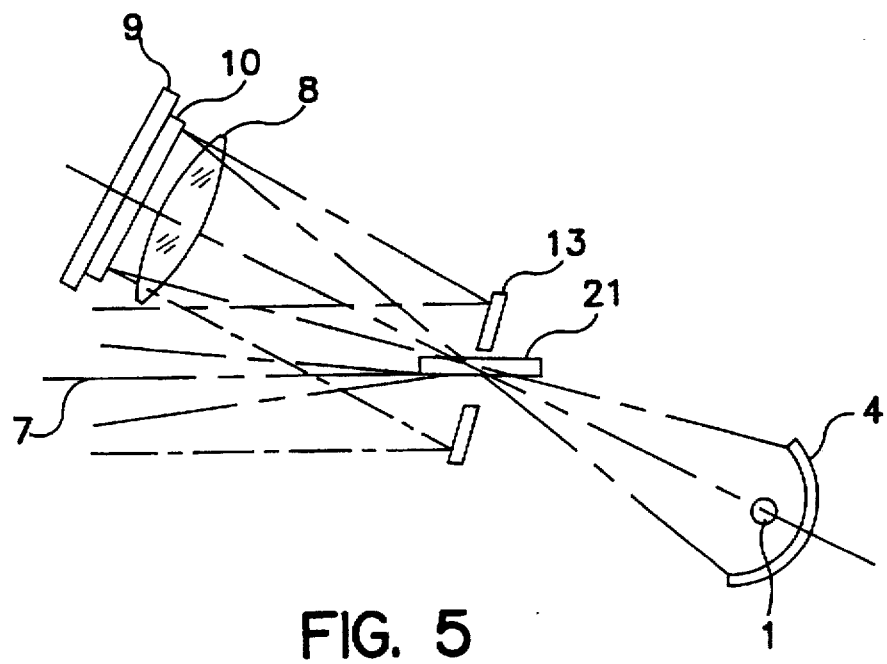
FIG. 5 is a diagram of a third embodiment of a lighting device transformed in the direction of polarization in accordance with the present invention.

Another embodiment of the lighting device transformed in the direction of polarization of the invention is described below by reference to FIG. 5. In FIG. 5, characteristically, a plane type polarization beam splitter 21 acts as a polarization selecting means at the aperture of the combined reflector 13. The other embodiment is the same as in embodiment 1 explained in FIG. 1. In this embodiment, the incident angle is larger. Hence, it is possible to split by polarization at a lower cost.

(Embodiment 4)

Figure 6:
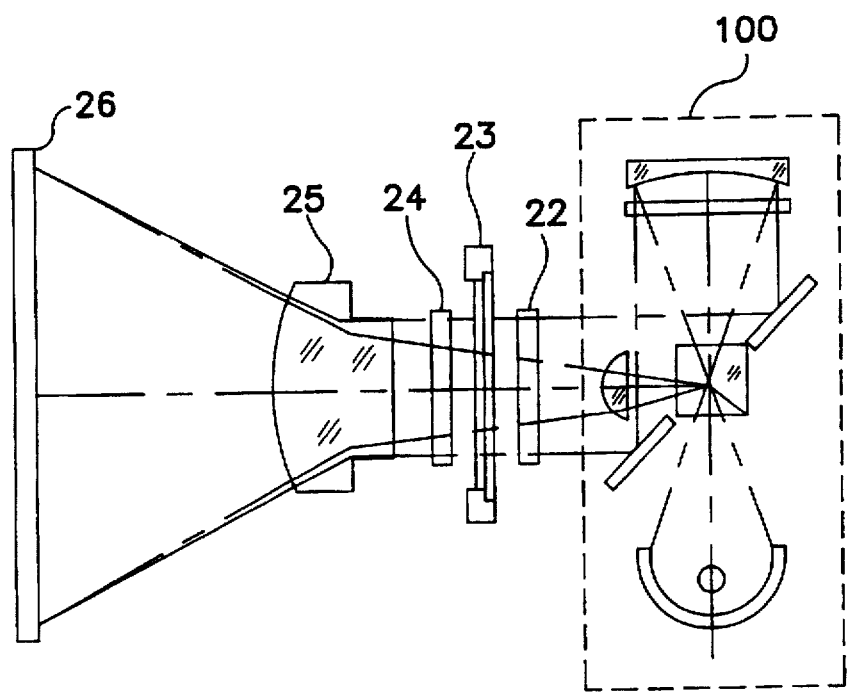
FIG. 6 is a diagram of a fourth embodiment of a projection type image display device in accordance with the present invention.

An embodiment of a projection type image display device of the invention is described below while referring to FIG. 6. FIG. 6 is an example of the projection type image display device using the lighting device transformed in the direction of polarization explained in FIG. 2.

In FIG. 6, the light emitted from a lighting device transformed in the direction of polarization 100 passes through an incident side polarizer 22 provided so that the passing direction of polarization coincides with the direction of polarization (S-polarization in FIG. 2) from the lighting device transformed in the direction of polarization 100, and enters a liquid crystal panel 23 which acts as the image display means. The liquid crystal panel 23 is composed of multiple picture elements which can be independently controlled by external signals. The light entering the picture elements of the liquid crystal panel 23 of the portion to be displayed in white of the image display area passes through the incident side polarizer 22, and, because the direction of polarization is shifted 90 degrees by the liquid crystal layer of the liquid crystal panel 23, passes through the incident side polarizer 22 and an exit side polarizer 24 orthogonal to the passing direction of polarization.

On the other hand, the light entering the picture elements of the liquid crystal panel 23 of the portion to be displayed in black of the image display area passes through the incident side polarizer 22, without being shifted in the direction of polarization by the liquid crystal layer of the liquid crystal panel 23, and enters the exit side polarizer 24 and is absorbed.

The light passing through the exit side polarizer 24 is guided onto a screen 26 by a projection lens 25. In this way, the picture elements in the display area of the liquid crystal panel 23 are magnified and projected by the projection lens 25. As a result, a large picture is obtained on the screen 26.

Previously, the liquid crystal panel could use light in one direction of polarization only, and thus about 50% of the light from the light source was absorbed in the incident side polarizer. Hence, the light utilization rate was poor. Still worse, since the incident side polarizer absorbs the light, heat generation is significant, and it was hard to obtain a high luminance. By contrast, in the present embodiment, all the light from the light source can be utilized effectively. As a result, the light utilization efficiency is enhanced, the heat generation is small, and the luminance is improved.

The embodiment of the lighting device transformed in the direction of polarization as shown in FIG. 6 represents the embodiment in FIG. 2, but the projection type image display device can also be realized by using the lighting device transformed in the direction of polarization shown in embodiment 1 through embodiment 4, and the same effects are obtained. In this embodiment, too, instead of the transmission type liquid crystal panel acting as the image display means, it is also possible to compose a reflection type liquid crystal panel.

(Embodiment 5)

Figure 7:
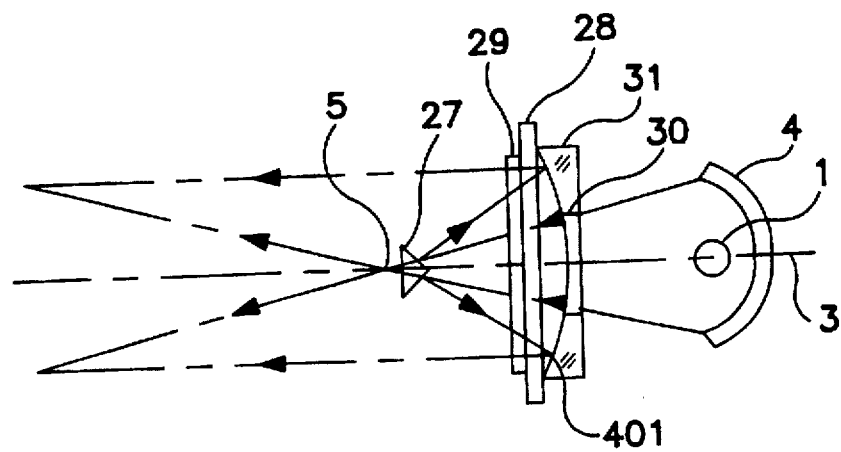
FIG. 7 is a diagram of a fifth embodiment of a lighting device transformed in the direction of polarization in accordance with the present invention.

A different embodiment of the lighting device transformed in the direction of polarization of the invention is described by referring to FIG. 7. In FIG. 7, the light emitted from the light source 1 is condensed in the second focal point position 5 by the elliptical mirror 4 formed to be rotationally symmetrical to the major axis of the first optical axis 3 so that the light source 1 may be positioned at the first focal point position 2. Near the second focal point position 5, a polarization beam splitter 27 is provided as a polarization selecting means, and this polarization beam splitter 27 transmits the P-polarized light, but reflects the S-polarized light, as shown in the diagram, to reflect to the light source side along the first optical axis 7. This polarization beam splitter 27 is formed by the combination of two planes composed symmetrically to the first optical axis 3.

The S-polarized light reflected by the polarization beam splitter 27 passes through a quarter-wave plate 29 which is a polarization transforming means provided in a support glass plate 28, and is transformed into circular polarized light. Afterwards, the circular polarized light is reflected by a concave mirror 31 (i.e., the optical path transforming means) having an aperture 30 for passing light from the light source 1 to the polarization beam splitter 27 in its central part, being formed to be rotationally symmetrical to the first optical axis 3, and is transformed into nearly parallel light 401. In this way, the light entering the quarter-wave plate 29 again is circular polarized light in the reverse direction of the incident light, and is thus emitted as S-polarized light after passing through the quarter-wave plate 29. The light passing through the quarter-wave plate 29 and the light passing through the polarization beam splitter 27 are both S-polarized lights, and these polarized lights are combined, and then sent out from the lighting device transformed in the direction of polarization.

Thus, also in this embodiment, most of the light emitted from the light source is emitted in one direction as light in one direction of polarization. Therefore, the light utilization efficiency is notably improved. At the same time, the reliability is extremely improved. Moreover, by the use of the concave mirror 31, the device is reduced in scale. The polarization beam splitter 27, instead of being composed of two planes positioned symmetrically on the first optical axis 3, may be formed as a prism-type polarization beam splitter or in a conical form having the center of rotation on the first optical axis.

In this embodiment, by the using the concave mirror 31, the device scale can be reduced. Instead of the concave mirror 31, by combination of the plane mirror and lens as shown in embodiment 1 to embodiment 3, the same effects are obtained.

(Embodiment 6)

Figure 8:
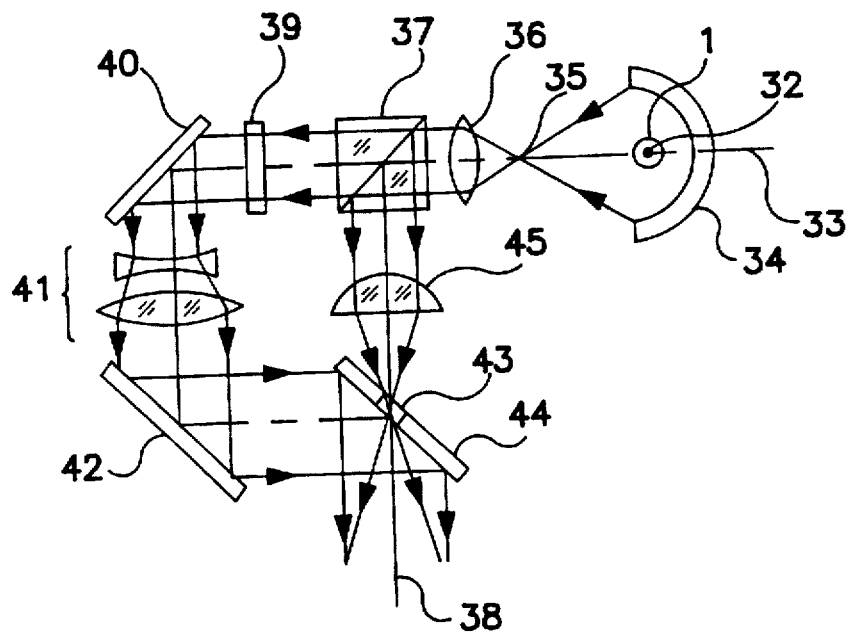
FIG. 8 is a diagram of a sixth embodiment of a lighting device transformed in the direction of polarization in accordance with the present invention.

A different embodiment of the lighting device transformed in the direction of polarization of the invention is described in FIG. 8. In FIG. 8, the light emitted from the light source 1 is condensed in a second focal point position 35 by an elliptical mirror 34 formed to be rotationally symmetrical to the major axis of a first optical axis 33 so that the light source 1 may be positioned at a first focal point position 32. The light passing through the second focal point position 35 is transformed into nearly parallel light by a collimator lens 36, which acts as the parallel light transforming means, and enters a polarization beam splitter 37, which acts as the polarization selecting means.

In the polarization beam splitter 37, the S-polarized light of the incident parallel light is reflected and travels on a second optical axis 38. On the other hand, the P-polarized light passes through the reflection plane of the polarization beam splitter 37, and passes through a half-wave plate 39 (i.e., the polarization transforming means) on the first optical axis 33. On the half-wave plate 39, the P-polarized light is transformed into S-polarized light. It is then reflected by a reflector 40, and enters a luminous flux magnifying lens 41, which acts as the luminous flux magnifying means. The luminous flux magnifying lens 41 is designed to magnify the luminous flux of the entering nearly parallel light because it is nearly parallel light. The light passing through the luminous flux magnifying lens 41 is reflected by a reflector 42, and enters a combined reflector 44, which acts as the optical path transforming means having an aperture 43 in the center.

On the other hand, the S-polarized light traveling up to the second optical axis 38 passes through a condenser lens 45, and is condensed in the aperture 43 of the reflector 44 or its vicinity. Therefore, the S-polarized light traveling on the second optical axis 38 continues to travel on the second optical axis 38 without being affected by the reflector 44. The light reflected by the reflector 42 and entering the combined reflector 44 is reflected by the combined reflector 44, and is reflected to travel on the second optical axis 38. The light entering from the reflector 42 passes through an intermediate half-wave plate 39, and the P-polarized light is transformed into S-polarized light, and finally the light emitted from this lighting device, transformed in the direction of polarization, is entirely S-polarized light.

According to this embodiment, by keeping the position of the polarization selecting means away from the optical path transforming means, the structure is more complicated than in the foregoing embodiments, but the luminous flux entering the polarization beam splitter 37 is closer to parallel light, and hence the efficiency of splitting of the optical path by the direction of polarization is extremely enhanced. Moreover, since the polarization selecting means is not placed at the position of the aperture 43, the size of the aperture is reduced. Therefore, the reflection loss of the light entering from the reflector 42 is kept to a minimum limit.

In this embodiment, if the luminous flux diameter after passing through the collimator lens 36 is sufficiently smaller than the luminous flux after passing through the luminous flux magnifying lens 41, the condenser lens 45 may not always be necessary. If the luminous flux condensed in the condenser lens 45 is sufficiently smaller than the luminous flux after passing through the collimator lens 36, the luminous flux magnifying lens 41 may not always be necessary. By setting the lens of the collimator lens 36 to focus on the position of the aperture 43 or its vicinity, the condenser lens 45 can be omitted.

The embodiment and location of the half-wave plate 39, which acts as the polarization transforming means, are not limited to the above means. That is, instead of the half-wave plate 39, a quarter-wave plate may be used as a phase difference plate.

In FIG. 8, the elliptical mirror 34 is used, but a parabolic reflector such as the one shown in FIG. 3 may be also used. If the aperture of the parabolic reflector is wide, a condenser lens may be also positioned at the exit side.

A projection type image display device can be realized by using the lighting device transformed in the direction of polarization of the embodiment as the lighting device transformed in the direction of polarization 100 explained in embodiment 14. In this embodiment, too, the same effects as in embodiment 4 are obtained.

(Embodiment 7)

Figure 9:
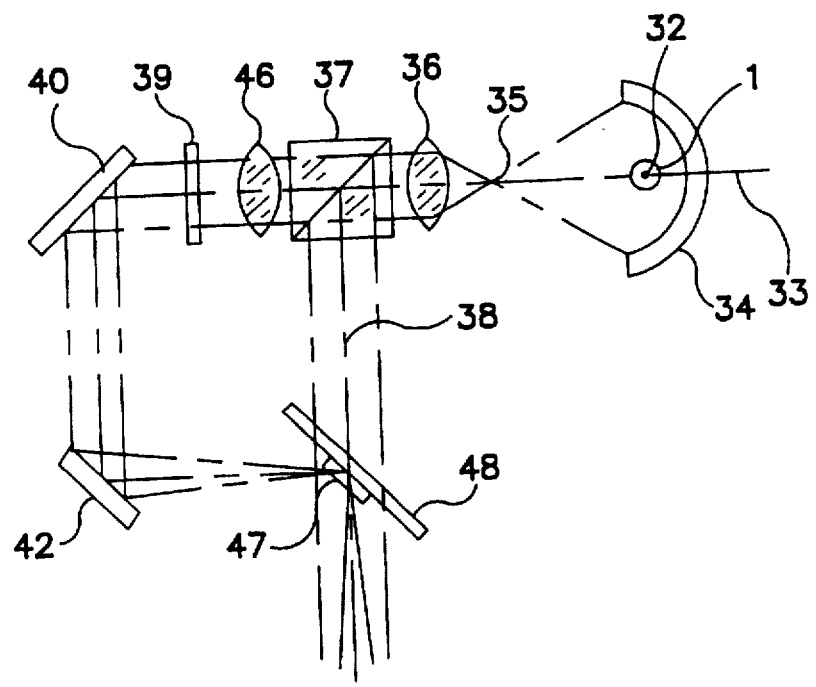
FIG. 9 is a diagram of a seventh embodiment of a lighting device transformed in the direction of polarization in accordance with the present invention.

A further different embodiment of the lighting device transformed in the direction of polarization of the invention is described by reference to FIG. 9. In FIG. 9, the light emitted from the light source 1 is condensed in a second focal point position 35 by an elliptical mirror 34 formed to be rotationally symmetrical to the major axis of a first optical axis 33 so that the light source 1 may be positioned at a first focal point position 32. The light passing through the second focal point position 35 is transformed into nearly parallel light by a collimator lens 36, which acts as the parallel light transforming means, and enters a polarization beam splitter 37 acting as the polarization selecting means. The polarization beam splitter 37 reflects the S-polarized light, and allows it to travel onto the second optical axis 38. On the other hand, the P-polarized light passes through the reflection plane of the polarization beam splitter 37, and passes through the condenser lens 46 on the first optical axis 33, half-wave plate 39, reflector 40 and reflector 42, and is condensed on a combined reflector 47 acting as the optical path transforming means. The combined reflector 47 is provided on a support glass plate 48 for transmitting the visible light, and is disposed obliquely on the second optical axis 38.

On the other hand, the S-polarized light traveling along the second optical axis 38 is sufficiently larger in the luminous flux width than the combined reflector 47, and hence continues to travel on the second optical axis 38 without being affected by the combined reflector 47. The light entering the reflector 47 through the reflector 42 is reflected by the combined reflector 47 so as to travel on the second optical axis 38. The light entering the combined reflector 47 from the reflector 42 passes an intermediate half-wave plate 39, and is shifted in the direction of polarization, and hence the P-polarized light is transformed into S-polarized light. Therefore, finally, all the light emitted from the lighting device transformed in the direction of polarization is S-polarized light only.

In this embodiment, since the light entering the polarization beam splitter 37 is closer to parallel light, the efficiency of optical path splitting by the direction of polarization may be enhanced. At the same time, the combined reflector 47, which acts as the optical path transforming means, may be reduced in size. It further provides an effect of minimizing the defect of the light entering from above the second optical axis 38.

In the embodiment, the polarization transforming means and its location are not limited to the above embodiment, but, instead of the half-wave plate, a quarter-wave plate may be used as a phase difference plate.

(Embodiment 8)

Figure 10:
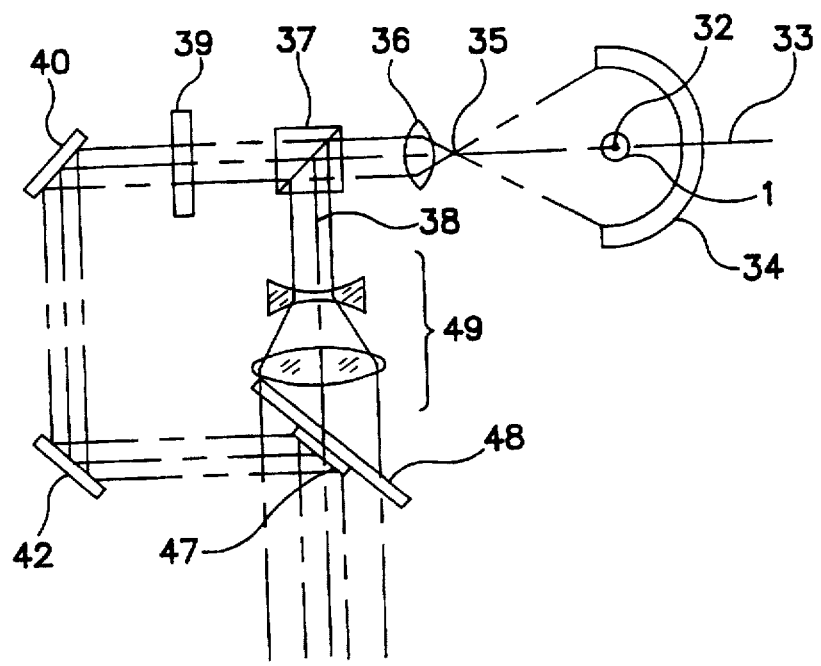
FIG. 10 is a diagram of an eighth embodiment of a lighting device transformed in the direction of polarization in accordance with the present invention.

A different embodiment of a lighting device transformed in the direction of polarization of the invention is described by referring to FIG. 10. In FIG. 10, as in the example in FIG. 9, the P-polarized light split by the polarization beam splitter 37, which is the polarization selecting means, passes through the reflection plane, and enters the combined reflector 47, which is the optical path transforming means, by way of the half-wave plate 39 on the first optical axis 33, reflector 40 and reflector 42. The combined reflector 47 is provided on the support glass plate 48 for transmitting visible light, and is positioned obliquely on the second optical axis 38.

On the other hand, the S-polarized light traveling along the second optical axis 38 is transformed by the luminous flux magnifying lens 49 so that the luminous flux width may be sufficiently larger than the combined reflector 47, and continues to travel on the second optical axis 38 without being affected by the combined reflector 47. The first light entering the combined reflector 47 through the reflector 42 is reflected by the combined reflector 47 so as to travel on the second optical axis 38.

The light entering from the reflector 42 passes through an intermediate half-wave plate 39, and is shifted in the direction of polarization, and the first P-polarized light is transformed into S-polarized light. Therefore, finally, all the light emitted from this lighting device is S-polarized light only. In this embodiment, the same effects as in embodiment 1 are obtained.

In the embodiment, the polarization transforming means and its location are not limited to the half-wave plate 39, but, instead, a quarter-wave plate may be used as a phase difference plate.

Moreover, in the embodiment in FIG. 9 and FIG. 10, instead of the elliptical mirror 34, a parabolic reflector for emitting parallel light may be used to compose the same lighting device transformed in the direction of polarization.

A projection type image display device can be formed by using the lighting device transformed in the direction of polarization of the embodiment as the lighting device transformed in the direction of polarization 100 explained in embodiment 14. In this embodiment, too, the same effects as in embodiment 14 are obtained.

(Embodiment 9)

Figure 11:
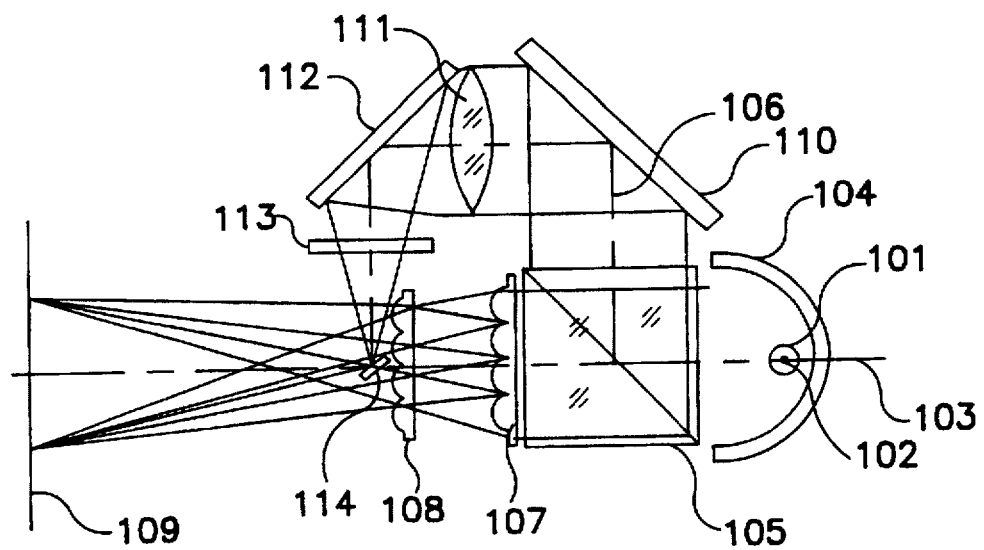
FIG. 11 is a diagram of a ninth embodiment of a lighting device transformed in the direction of polarization in accordance with the present invention.

A different embodiment of the lighting device transformed in the direction of polarization is described in FIG. 11. In FIG. 11, the light emitted from a light source 101 is reflected by a parabolic reflector 104, and enters a polarization beam splitter 105, which acts as a polarization selecting means. The parabolic reflector 104 is positioned to be rotationally symmetric to a first optical axis 103 so that the light source 101 may be positioned at a focal point position 102. The polarization beam splitter 105 reflects the S-polarized light, and causes the S-polarized light to travel on a second optical axis 106. On the other hand, the P-polarized light passes through the reflection plane of the polarization beam splitter 105, and enters a first integrator lens array 107 which acts as an integrator means on the first optical axis 103. The incident light is split into a plurality of rays of light by each lens of the first integrator lens array 107. Each split light forms a secondary light source image on each corresponding lens of a second integrator lens array 108 which is an integrator means. Each light emitted from the second integrator lens array 108 forms a magnified image superposed on each irradiation surface 109.

The light traveling along the second optical axis 106 enters a condenser lens 111 after being guided by a reflector 110 positioned obliquely to the optical axis, and is condensed on a reflector 112 positioned obliquely to the optical axis, and on a small reflector 114, acting as an optical path transforming means, through a phase difference plate 113. At this time, the phase difference plate 113, which is the polarization transforming means, is set so that the direction of polarization is the same as the direction of polarization of the light traveling on the first optical axis 103. The small reflector 114 is positioned obliquely to the first optical axis. This small reflector 114 is set so that the light traveling on the optical axis being guided by the reflector 111 illuminates the region on the same irradiation surface 109 as the position illuminated by the light emitted from the second integrator lens array 108.

According to the embodiment, most of the light emitted from the light source 101 is emitted to illuminate as light in one direction of polarization only.

In this embodiment, the light source 101 is desirably closer to a spot light source. In this embodiment, the image may be formed small on the small reflector 114. Therefore, of the light transmitted through the integrators 107 and 108, the rate of the light cut off by the small reflector 114 is small, so that the effective utilization efficiency of light is enhanced. Likewise, it is also effective to use a large condenser lens 111 to reduce the light source image to reduce the size of the small reflector 114, and position a relay lens at the exit side of the small reflector 114 to illuminate the necessary region on the irradiation surface 109.

The light traveling on the first optical axis 103 and passing through the polarization beam splitter 105 can illuminate uniformly by the integrators 107 and 108. However, the light traveling on the second optical axis 106 and reflected by the polarization beam splitter 105 may possibly cause uneven colors on the irradiation surface 109 if the luminous portion of the light source is uneven in color. In the event of such color unevenness, by positioning a rod type integrator near the small reflector 114, the color uniformity may be enhanced in the light reaching up to the irradiation surface 109 through the small reflector 114.

In the embodiment, the phase difference plate of polarization transforming means is used as the transforming means of direction of polarization, but the embodiment is not limited to this. It is also possible to use means placed on the surface of the polarization beam splitter 105 passing after the optical path is split in the direction of polarization by the polarization beam splitter 105, on the reflectors 110, 112, or on the condenser lens 111. The transforming means of the direction of polarization is provided on the optical path of the second optical axis 106 side, being reflected by the polarization beam splitter 105, but instead of this embodiment, it may be also placed on the optical path of the light traveling onto the first optical axis 103 after passing through the polarization beam splitter 105. The same characteristics are obtained if positioned on either side. The invention is not limited by the transforming means of direction of polarization.

In the embodiment, the parabolic reflector 104 is used as the means for controlling the light of the light source 101, but this is not limiting. For example, it may be replaced by an elliptical mirror, the light source may be set at its first focal point position, and the small reflector 114 may be set at the second focal point position. In this embodiment, the condenser lens 111 is not required. If, however, the parallelism of the light entering the polarization beam splitter 105 is poor, the degree of splitting by the direction of polarization drops, and therefore an embodiment short in the distance between focal points is not desirable. It is also possible to compose by using means for transforming into parallel light. The position of the small reflector 114 is desirably on the first optical axis 103 or on the central line symmetrically dividing the irradiation surface 109, but it is not particularly limited so long as it is within a practically permitted range.

(Embodiment 10)

Figure 12:
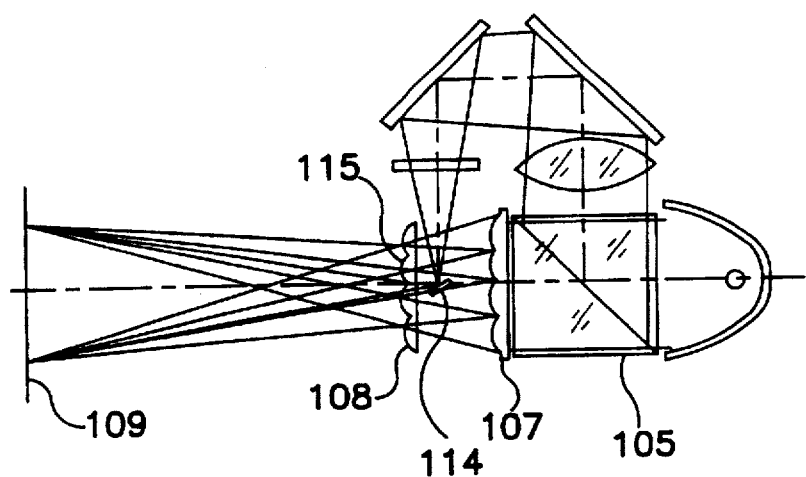
FIG. 12 is a diagram of a tenth embodiment of a lighting device transformed in the direction of polarization in accordance with the present invention.

A different embodiment of the lighting device transformed in the direction of polarization of the invention is described in FIG. 12. In embodiment 9, the small reflector 114 is positioned at the exit side of the second integrator array 108, whereas in this embodiment, as shown in FIG. 12, the small reflector 114 is positioned between the first integrator array 107 and second integrator array 108. In this embodiment, the same effect as in embodiment 9 is obtained. Furthermore, in the direction of the first optical axis 103, the lighting device transformed in the direction of polarization can be formed on a smaller scale. In FIG. 12, an aperture 115 of the second integrator lens array 108 is positioned in the passing area of the light through the small reflector 114. Instead of this embodiment, it is also possible to compose a parallel flat plate in the passing area of the light through the small reflector 114, and in this embodiment, as the light through the small reflector 114 passes through the second integrator lens array 108, it reaches the target of the irradiation surface 109. It is further possible to constitute by comprising a lens for illuminating the irradiation surface 109 most efficiently by the light through the small reflector 114 positively, and the degree of design freedom is enhanced by this embodiment. In the case of a rectangular shape of the illuminated surface 109, it is desirable to place a lens in a shape asymmetrical in the vertical and lateral directions.

(Embodiment 11)

Figure 13:
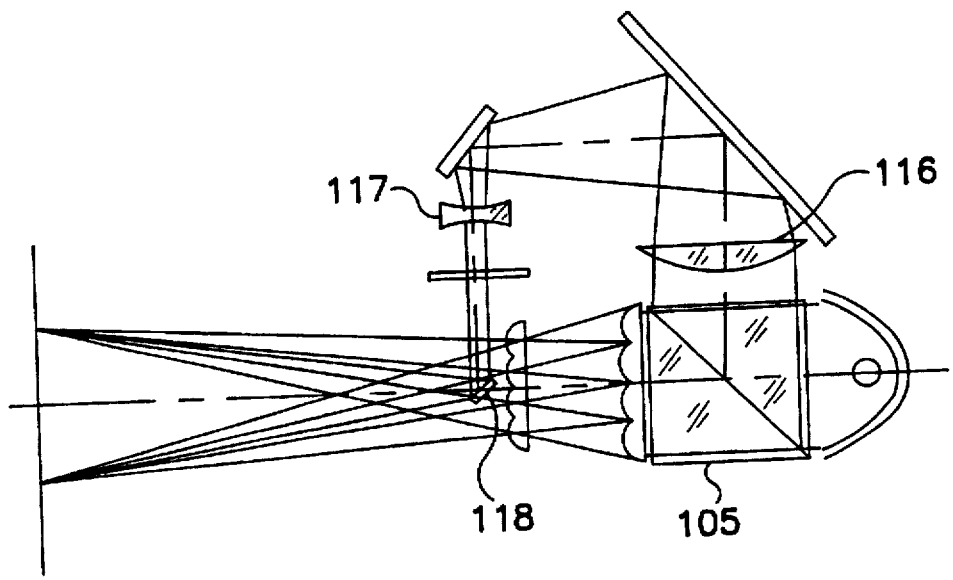
FIG. 13 is a diagram of an eleventh embodiment of a lighting device transformed in the direction of polarization in accordance with the present invention.

A different embodiment of the lighting device transformed in the direction of polarization of the invention is described in FIG. 13. In FIG. 13, the light reflected by the polarization beam splitter 105, acting as the polarization selecting means is transformed into nearly parallel light reduced in the luminous flux by luminous flux width transforming lenses 116 and 117, acting as the luminous flux transforming means, and then enters a small reflector 118 which is an optical path transforming means. This small reflector 118 is formed in a curvature so that the light reflected by it may be superposed in the range illuminated by the second integrator lens array 108. In this embodiment, the regulation of the condensing position is not strict, and the degree of design freedom of the condenser lens is larger.

Figure 14:
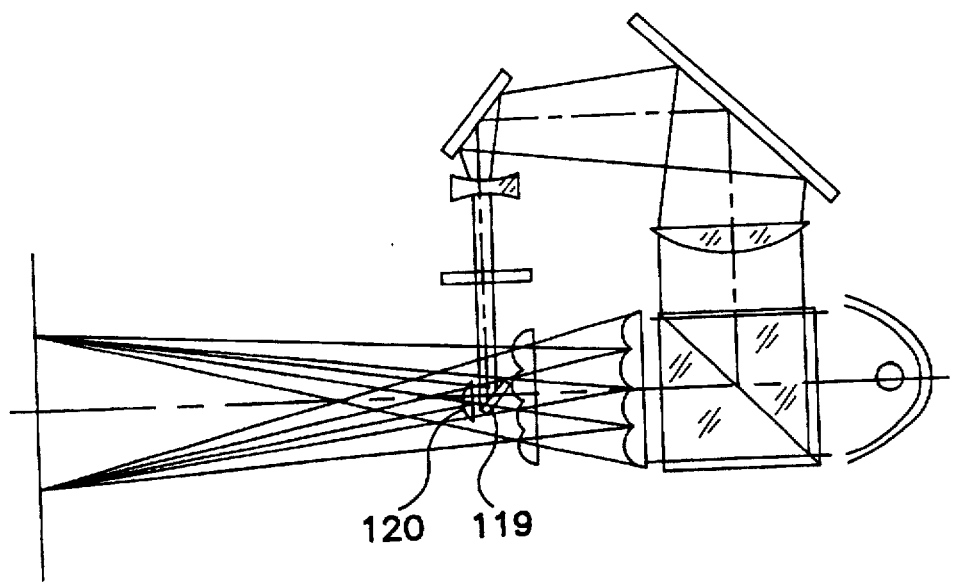
FIG. 14 is a diagram of a modified eleventh embodiment of a lighting device transformed in the direction of polarization in accordance with the present invention.

Or, as shown in FIG. 14, it is also possible to install a projector lens 120 at the exit side of the small reflector 119. In this embodiment, the same effects as in the embodiment in FIG. 13 are obtained.

Embodiment 9 through embodiment 11 relate to examples of using the polarization beam splitter 105 as the polarization selecting means for splitting the optical path by the direction of polarization. Generally, however, the transmitted light and reflected light of the polarization beam splitter 105 are mutually different in characteristics. Therefore, to obtain the optimum characteristic, it is desirable to select the light of either optical path to be transformed in polarization.

Figure 15:
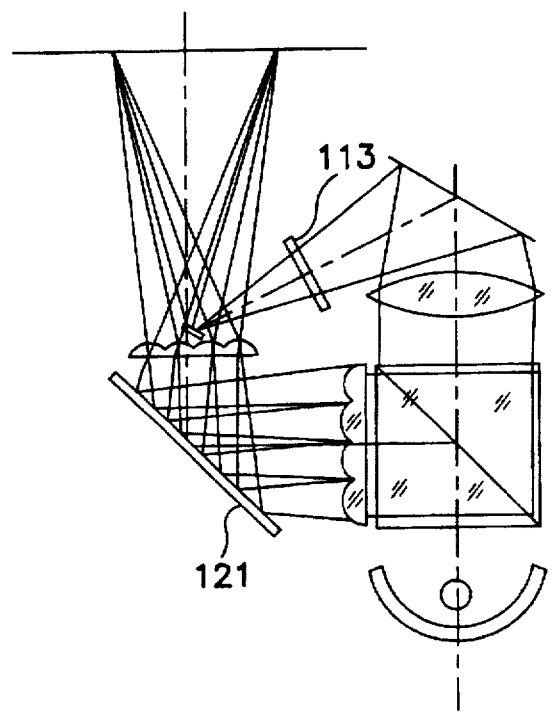
FIG. 15 is a diagram of a further modified eleventh embodiment of a lighting device transformed in the direction of polarization in accordance with the present invention.

FIG. 15 shows an example of positioning an integrator means at the reflected light side of the polarization beam splitter 105. In this embodiment, further excellent characteristics may be obtained.

(Embodiment 12)

Figure 16:
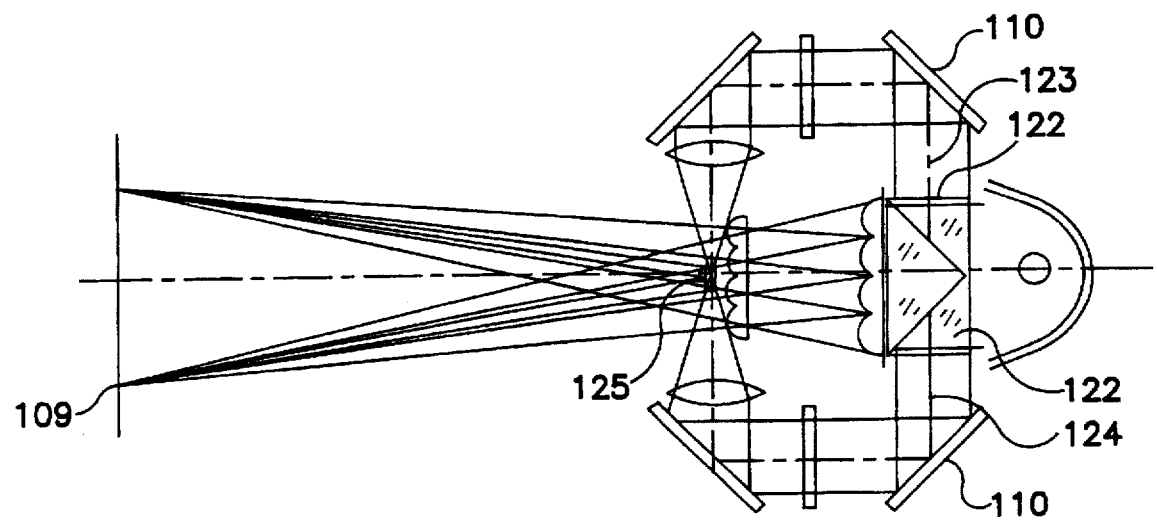
FIG. 16 is a diagram of a twelfth embodiment of a lighting device transformed in the direction of polarization in accordance with the present invention.

A different embodiment of the lighting device transformed in the direction of polarization of the invention is described in FIG. 16. In FIG. 16, a polarization beam splitter 22 having a half incident area as compared with the polarization beam splitter described in the foregoing embodiments is divided into two portions, and two polarization beam splitters 122 divided into two portions each are formed. In this way, by comprising a plurality of polarization selecting means, the incident light is split into a second optical axis 123 and a third optical axis 124, and the irradiation surface 109 is illuminated by a small reflector 125. At this time, the volume of two polarization beam splitters 122 is half that of the polarization beam splitter 105, and the cost is lowered, and hence the size and weight are reduced. In this embodiment, two polarization beam splitters are arranged in parallel. The same effects are obtained by one polarization beam splitter having a similar reflection plane.

Figure 17:
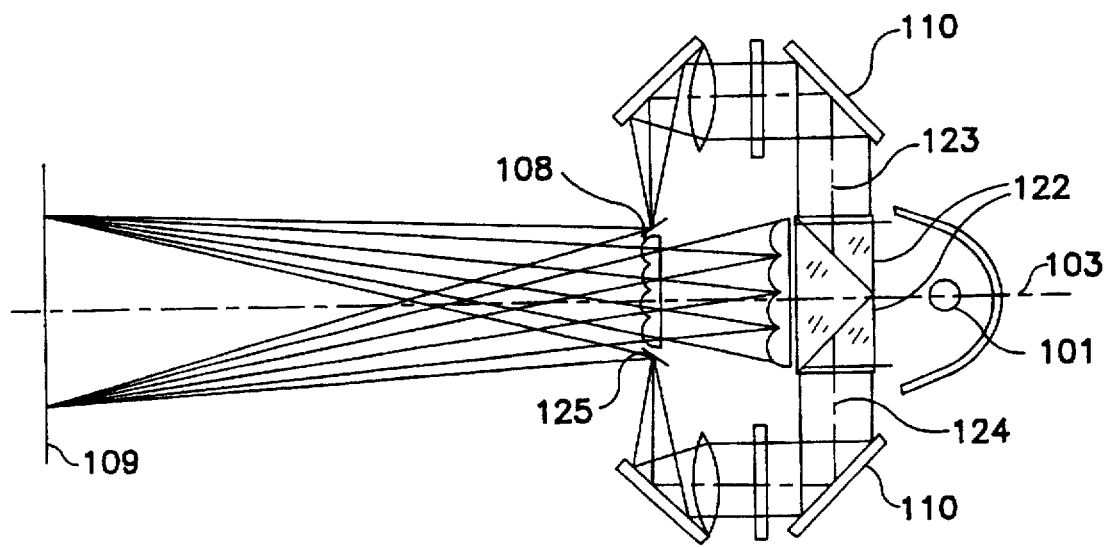
FIG. 17 is a diagram of a modified twelfth embodiment of a lighting device transformed in the direction of polarization in accordance with the present invention.

FIG. 17 shows a lighting device transformed in the direction of polarization using the polarization beam splitter 122. In this embodiment, the small reflector 125 which is the optical path transforming means is positioned at the outside or near the second integrator array 108. In this example, the projection lens desirably has such a brightness as to take in up to the position of the small reflector 125, but since the small reflector 125 is very small as compared with the second integrator array 108, significant change is not desired.

When the position of the small reflector 125 is located at the exit side of the effective aperture on the second integrator array 108, it is not always desirable to be located in its center as described so far, and it is preferable to position the small reflector 125 at position of weak distribution of illumination. In this case, it is preferred to locate the irradiation surface at a position corresponding to the central line to be split symmetrically. In the case of positioning plural small reflectors 125, they are preferred to be placed symmetrically on both sides of the central line.

The shape of the irradiation surface 109 and the shape of the light source image coming out through the polarization beam splitter 122 are similar, and the constituent elements are positioned to adjust the magnifying power of these shapes so that the greatest brightness may be obtained. As a result, the polarization transforming efficiency is enhanced.

Figure 18:
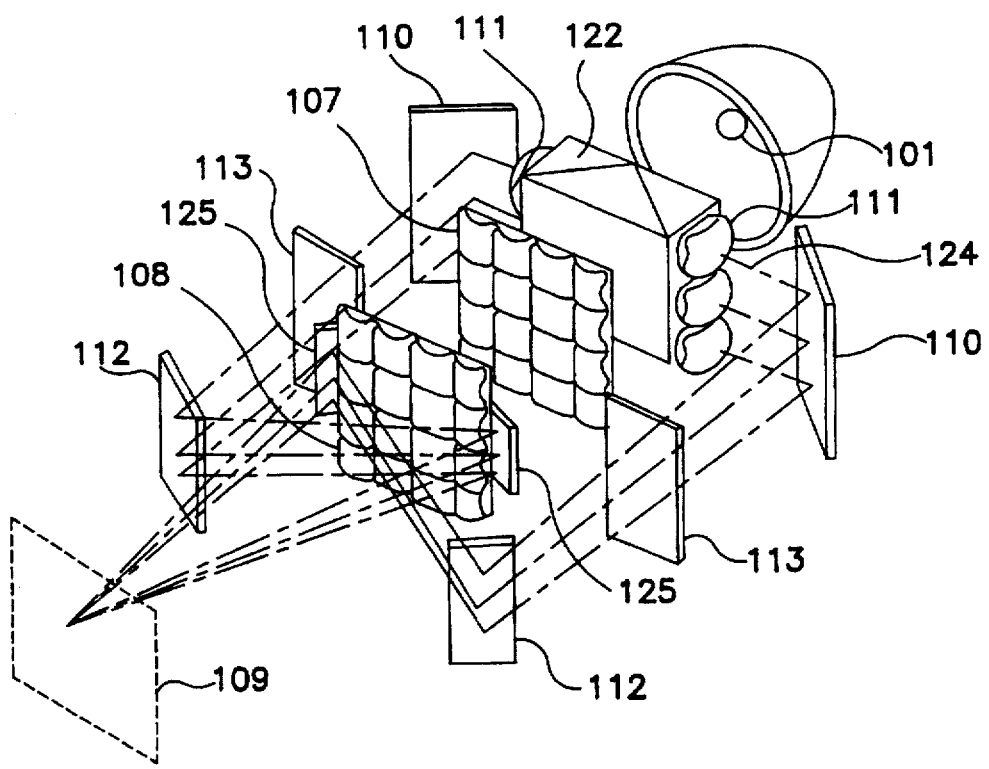
FIG. 18 is a perspective view of a modified twelfth embodiment of a lighting device transformed in the direction of polarization in accordance with the present invention.

In FIG. 18, a condenser lens 111 is provided on the exit plane of the polarization beam splitter 122, and the exit light is split optically. In this embodiment, each shape of the exit light is similar to the shape of the irradiation surface 109 and is superposed on the irradiation surface 109. By thus constituting, the utilization efficiency of light is extremely increased. Moreover, by splitting the output of the polarization selecting means 122 into plural rays of light and superposing on the irradiation surface 109 in this way, color unevenness in the light source is made less obvious by superposing, and the uniformity of color can be enhanced.

In this embodiment, to adjust the magnifying factor, the small reflector 125 is positioned so that the polarized and transformed light travels across the front surface of the second integrator array 108. Since the condenser lens 111 is set at a position having the center of curvature deviated to the incident light as desired, each split image is superposed at the same position on the irradiation surface 109.

(Embodiment 13)

Figure 19:
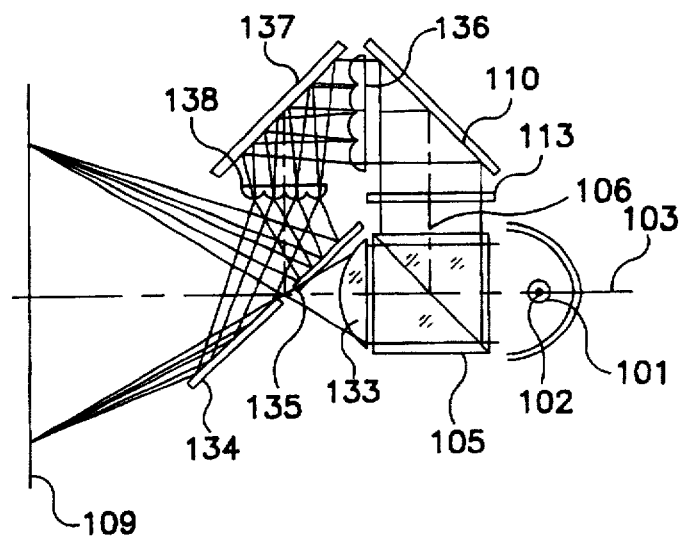
FIG. 19 is a diagram of a thirteenth embodiment of a lighting device transformed in the direction of polarization in accordance with the present invention.

Another embodiment of the lighting device transformed in the direction of polarization of the invention is described by reference to FIG. 19. In FIG. 19, the light emitted from a light source 101 is reflected by a parabolic reflector 104, and enters a polarization beam splitter 105. The parabolic reflector 104 is positioned in rotational symmetry to a first optical axis 103 so that the light source 101 may be positioned at a focal point position 102. The polarization beam splitter 105 reflects the S-polarized light, and causes the S-polarized light to travel onto a second optical axis 106. The P-polarized light passes through the reflection plane of the polarization beam splitter 105, and is further condensed on a small aperture 135 provided in a combined reflector 134 positioned obliquely to the optical axis 103 by a condenser lens 133, and passes through it and illuminates on the irradiation surface 109.

On the other hand, the light traveling along the second optical axis 106 passes through a phase difference plate 113, which acts as a polarization transforming means, and the direction of polarization is transformed. The phase difference plate 113 is set to have the same direction of polarization as the direction of polarization of the light traveling on the first optical axis 103. Afterwards, the light is reflected by the reflector 110 positioned obliquely to the optical axis, and is provided to the first integrator array 136 of the integrator means. The incident light is divided by each lens of the first integrator array 136. The split light is guided by a reflector 137, and a secondary light source image is formed on the lens of the second integrator lens array 138 of each corresponding integrator means. The light emitted therefrom is reflected by the combined reflector 134 of the optical path transforming means, and then magnified views are superposed and formed on the irradiation surface 109.

In this embodiment, too, most of the light emitted from the light source 101 is emitted as light in only one direction of polarization to illuminate. In the embodiment, the light source 101 is preferably close to a spot light source. This is because the image formed on the aperture is small, and the rate of escaping through the small aperture 135 is small in the light passing through the integrator means. Similarly, by using a large condenser lens 133 for reducing the light source image to decrease the size of the small aperture 135, it is effective to place a relay lens at the exit side of the small aperture 135 for illuminating the necessary region on the irradiation surface 109. Such an embodiment is also possible.

The light traveling on the second optical axis 106 and reflected by the polarization beam splitter 105 illuminates uniformly through integrator means 136 and 138. However, the light traveling on the first optical axis 103 and passing through the polarization beam splitter 105 may possibly cause uneven colors on the irradiation surface 109 if there is color unevenness in the luminous portion of the light source. In the event of such color unevenness, by placing a rod type integrator in the small aperture 135 (or its vicinity), the color uniformity may also be enhanced in the light reaching the irradiation surface 109 through the small aperture 135.

The position of the small aperture 135 is preferably on the first optical axis 103 or on the central line in the symmetrical position of the irradiation surface 109, but this is not particularly limited as far as it is within a practically permissible range.

In this embodiment, as in embodiment 1, the optical path reflected by the polarization beam splitter may be formed in two divided sections.

(Embodiment 14)

Figure 20:
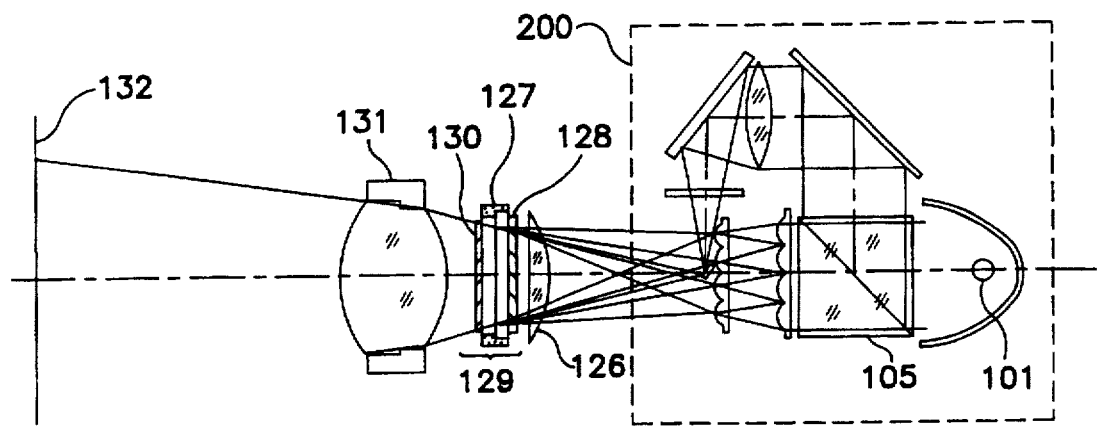
FIG. 20 is a diagram of a fourteenth embodiment of a projection type image display device in accordance with the present invention.

An embodiment of a projection type image display device of the invention is described while referring to FIG. 20. FIG. 20 is a structural diagram of the projection type image display device using the lighting device transformed in the direction of polarization of embodiment 9 described in FIG. 11.

The light from a light source 101 enters a field lens 126 as combined light of the same polarized light, as explained in embodiment 9 in FIG. 11, and is emitted from a lighting device transformed in the direction of polarization 200. At this time, it is arranged so that the position of the irradiation surface 109 corresponds to a liquid crystal surface 127.

The telecentric property is realized because the light entering the field lens 126 has the same incident angle regardless of the ray height of the principal ray of light relative to the liquid crystal surface 127. The light passing through the field lens 126 is limited to polarized light in only one direction by an incident side polarizer 128. The direction of polarization is limited by the lighting device transformed in the direction of polarization 200 before entering the incident side polarizer 128. If, however, the degree of polarization is insufficient due to performance of the polarization beam splitter 105 and random reflection on the interface, and a projected image having a sufficient contrast cannot be obtained, it is desirable to install a polarizer 128. Depending on the necessity, however, it is also possible to form the embodiment without the polarizer 128.

The light passing through the incident side polarizer 128 enters a liquid crystal panel 129. The liquid crystal panel 129 is composed of multiple picture elements controllable independently from external signals, and the light entering the picture elements of the portion to be displayed in white of the image display portion of the liquid crystal panel passes through the incident side polarizer 128 and is shifted 90 degrees in the direction of polarization by the liquid crystal surface 127, and hence passes through an exit side polarizer 130 orthogonal to the direction of polarization passing through the incident side polarizer 128. On the other hand, the light entering the picture elements in the portion to be displayed in black of the image display portion of the liquid crystal panel 129 passes through the incident side polarizer 128, and passes through the liquid crystal surface 127 without being shifted in the direction of polarization, and is provided into the exit side polarizer 130 and is absorbed. The image display means is composed of the liquid crystal panel 129, incident side polarizer 128 and exit side polarizer 130.

The light passing through the exit side polarizer 130 is guided onto the screen 132 by projection lens 131. In this way, by magnifying and projecting the picture elements in the display area of the liquid crystal panel 129 by the projection lens 131, a large image is obtained on the screen 132.

In the conventional liquid crystal panel, only light in one direction of polarization can be utilized, and hence only about 50% of the light from the light source can be absorbed in the incident side polarizer. It was hence difficult to increase the luminance due to the low utilization rate of light, large heat generation by absorption of light by the incident side polarizer, and deterioration of parts by heat generation.

By contrast, according to the embodiment, the light from the light source is fully utilized, the light utilization efficiency is increased, and a projection type image display device having high luminance and excellent reliability is obtained.

In the embodiment, the transmission type liquid crystal panel 129 is used as the light valve, but it is also possible to use a device for displaying by using polarization instead. For example, a reflection type liquid crystal panel can be also used.

(Embodiment 15)

Figure 21:
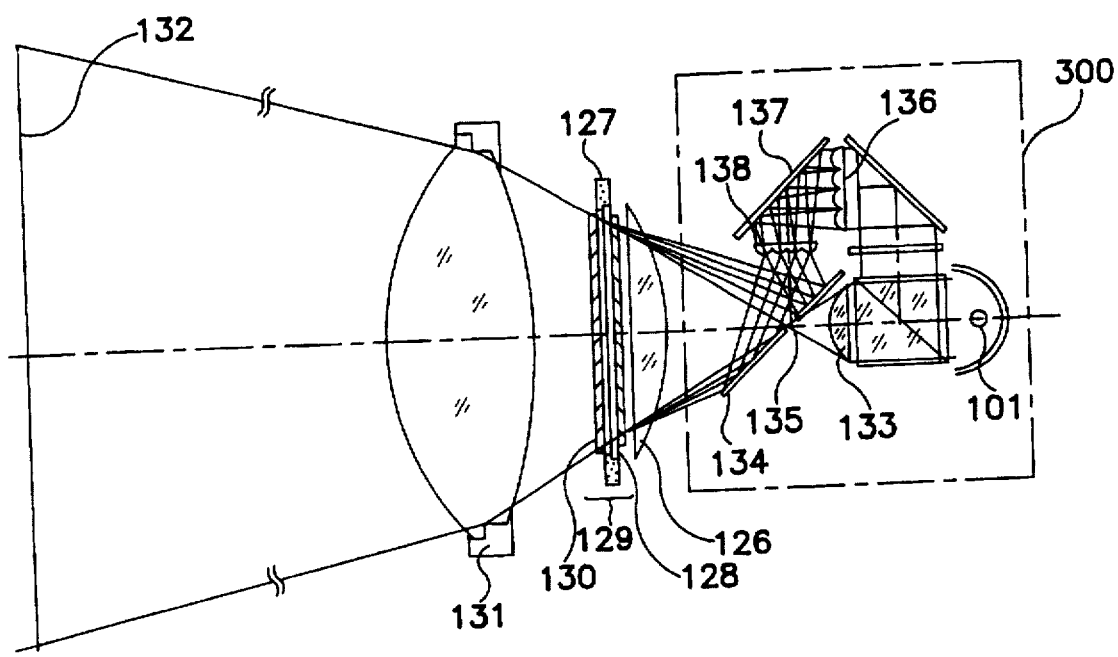
FIG. 21 is a diagram of a fifteenth embodiment of a projection type image display device in accordance with the present invention.

Another embodiment of the projection type image display device of the invention is described by referring to FIG. 21. FIG. 21 is a structural diagram of a projection type image display device using the lighting device transformed in the direction of polarization 300 of embodiment 13 explained in FIG. 19. The light from the light source 101 is emitted from the lighting device transformed in the direction of polarization 300 of embodiment 13 shown in FIG. 19, and enters the field lens 126. At this time, it is arranged so that the position of an irradiation surface 132 corresponds to the liquid crystal surface 127.

The telecentric property is realized with the light entering the field lens 126 having the same incident angle regardless of the ray height of the principal ray of light relative to the liquid crystal surface 127. The light passing through the field lens 126 is united to polarized light in one direction only by an incident side polarizer 128. The direction of polarization is limited by the lighting device transformed in the direction of polarization 300 before entering the incident side polarizer 128. If, however, the degree of polarization is insufficient due to the performance of the polarization beam splitter 105 and random reflection on the interface, and a projected image having a sufficient contrast cannot be obtained, it is desirable to install a polarizer in this manner.

The light passing through the incident side polarizer 128 enters a liquid crystal panel 129. The liquid crystal panel 129 is composed of multiple picture elements controllable independently from external signals, and the light entering the picture elements of the portion to be displayed in white of the image display portion of the liquid crystal panel passes through the incident side polarizer 128 and is shifted 90 degrees in the direction of polarization by the liquid crystal surface 127, and hence passes through an exit side polarizer 130 orthogonal to the direction of polarization passing through the incident side polarizer 128. On the other hand, the light entering the picture elements in the portion to be displayed in black of the image display portion of the liquid crystal panel 129 passes through the incident side polarizer 128, and passes through the liquid crystal surface 127 without being shifted in the direction of polarization, and is provided into the exit side polarizer 130 and is absorbed.

The light passing through the exit side polarizer 130 is guided onto the screen 132 by projection lens 131. In this way, by magnifying and projecting the picture elements in the display area of the liquid crystal panel 129 by the projection lens 131, a large image is obtained on the screen 132.

In the conventional liquid crystal panel, only light in one direction of polarization can be utilized, and hence only about 50% of the light from the light source can be absorbed in the incident side polarizer. It was hence difficult to increase the luminance due to the low utilization rate of light, large heat generation by absorption of light by the incident side polarizer, and deterioration of parts by heat generation.

By contrast, according to the embodiment, the light from the light source is fully utilized, the light utilization efficiency is heightened, and the projection type image display device having high luminance and excellent reliability is obtained.

In the embodiment, the transmission type liquid crystal panel is used as the light valve, but it is also possible to use a device for displaying by using polarization instead. For example, a reflection type liquid crystal panel can be also used.

In embodiment 1 through embodiment 15, the types of transmitted light and reflected light in the polarization selecting means (that is, S-polarized light and P-polarized light) are not particularly limited to the specified forms, but if the S-polarized light and P-polarized light are reversed, the same effects as in the embodiments are obtained.

Thus, in the device for controlling the output by utilizing polarization using a liquid crystal panel or the like such as a light valve, the conventional lighting device transformed in the direction of polarization could make use of light only in one direction of polarization, whereas the lighting device transformed in the direction of polarization of the invention can transform both P- and S-polarized light into one direction of polarization, and superpose the exit light on one optical axis. Therefore, the utilization efficiency of light is extremely increased. As a result, the brightness is about twice as large as in the prior art. Therefore, to obtain a lighting device with the same brightness as that of the prior art, the power consumption is decreased by one-half. Moreover, the light source and driving circuit are reduced in size and lowered in price.

The projection type image display device using the lighting device transformed in the direction of polarization prevents entry of light in an undesired direction of polarization in the light control unit of the image display means such as a liquid crystal panel, and heat generation decreases, so that a projection type image display device of excellent reliability and high luminance is obtained.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A lighting device transformed in the direction of polarization comprising:

a light source, polarization selecting means for separating a light from the light source into a first polarized light and a second polarized light, polarization transforming means for transforming the first polarized light into a transformed second polarized light, and optical path transforming means for reflecting the transformed second polarized light, wherein the optical path transforming means has a central region containing an aperture, the polarization selecting means is positioned at the aperture, and the reflected transformed second polarized light and the second polarized light are combined mutually in a same direction.

2. A lighting device transformed in the direction of polarization comprising:

a light source, polarization selecting means for separating a light from the light source into a first polarized light and a second polarized light, polarization transforming means for transforming the first polarized light into a transformed second polarized light, optical path transforming means for reflecting the transformed second polarized light, and luminous flux transforming means for changing a luminous flux width to transform the second polarized light into a luminous flux transformed second polarized light, wherein the optical path transforming means has a central region containing an aperture, the polarization selecting means is positioned at the aperture, and the transformed second polarized light reflected by the optical path transforming means and the luminous flux transformed second polarized light are combined mutually in a same direction.

3. A lighting device transformed in the direction of polarization comprising:

a light source, polarization selecting means for separating a light from the light source into a first polarized light and a second polarized light, polarization transforming means for transforming the first polarized light into a transformed second polarized light, reflecting means for reflecting the transformed second polarized light emitted from the polarization transforming means, and providing the transformed second polarized light back to the polarization transforming means, and optical path transforming means for combining the transformed second polarized light and the second polarized light, wherein the optical path transforming means has a central region containing an aperture, the polarization selecting means is positioned at the aperture, the transformed second polarized light reflected by the reflecting means and provided back to the polarization transforming means is reflected by the optical path transforming means, and the reflected transformed second polarized light and the second polarized light separated by the polarization selecting means are combined mutually in a same direction.

4. A lighting device transformed in the direction of polarization of claim 3, further comprising:

parallel light transforming means positioned between the polarization transforming means and the optical path transforming means, wherein the parallel light transforming means transforms the transformed second polarized light into second polarized light having parallel light.

5. A lighting device transformed in the direction of polarization of claim 3, wherein the polarization selecting means is a plane type polarization beam splitter.

* * * * *

UNITED STATES PATENT AND TRADE MARK OFFICE
CERTIFICATE OF CORRECTION

Page 1 of 2

PATENT NO. : 5,777,695
DATED : July 7, 1998
INVENTOR(S) : Yamagishi

It is certified that error appears in the above-identified patent and that said Letters Patent is hereby corrected as shown below:

Cover page, item [56] References Cited, list the following:

FOREIGN PATENT DOCUMENTS

WO 95/33222    7/1995    PCT
06289387       10/1994   Japan
02039084       2/1990    Japan
04127120       4/1992    Japan
07135145       5/1995    Japan

OTHER PUBLICATIONS

European Search Report for Int'l Appln. No. EP 96 30 3964 dated 18 February 1998.

Cover page item [57] Abstract, line 7, after "collimating" insert --means--.

Cover page item [57] Abstract, line 9, after "transforming" insert --means--.

UNITED STATES PATENT AND TRADE MARK OFFICE
CERTIFICATE OF CORRECTION

PATENT NO. : 5,777,695
DATED : July 7, 1998
INVENTOR(S) : Yamagishi

It is certified that error appears in the above-identified patent and that said Letters Patent is hereby corrected as shown below:

Cover page item [57] Abstract, line 10, after "collimating" insert --means--.

Cover page item [57] Abstract, line 10, after "transforming" insert --means--.

Cover page item [57] Abstract, line 13, after "selecting" insert --means--.

Cover page item [57] Abstract, line 14, after "collimating" insert --means--.

Cover page item [57] Abstract, line 18, after "transforming" insert --means--.

Cover page item [57] Abstract, line 19, after "selecting" insert --means--.

Signed and Sealed this

Sixth Day of April, 1999

Attest:

Q. TODD DICKINSON

Attesting Officer

Acting Commissioner of Patents and Trademarks